Figure 1:
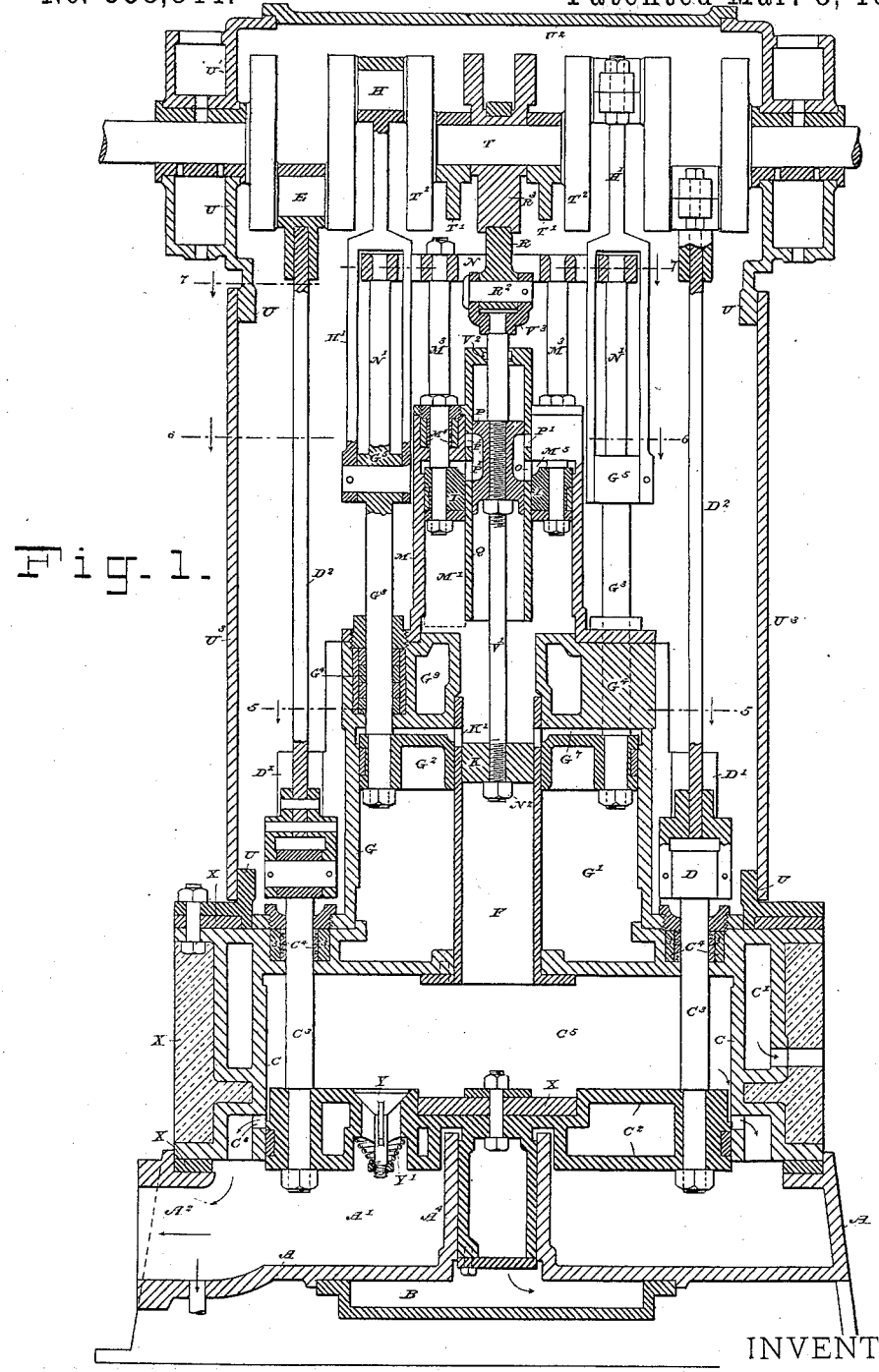

(No Model.) 6 Sheets—Sheet 1.

R. CREUZBAUR.
STEAM ENGINE.

No. 358,844. Patented Mar. 8, 1887.

WITNESSES:
E. B. Bolton
Frank Moulin

INVENTOR:
Robert Creuzbaur
By his Attorney,
Henry Connett

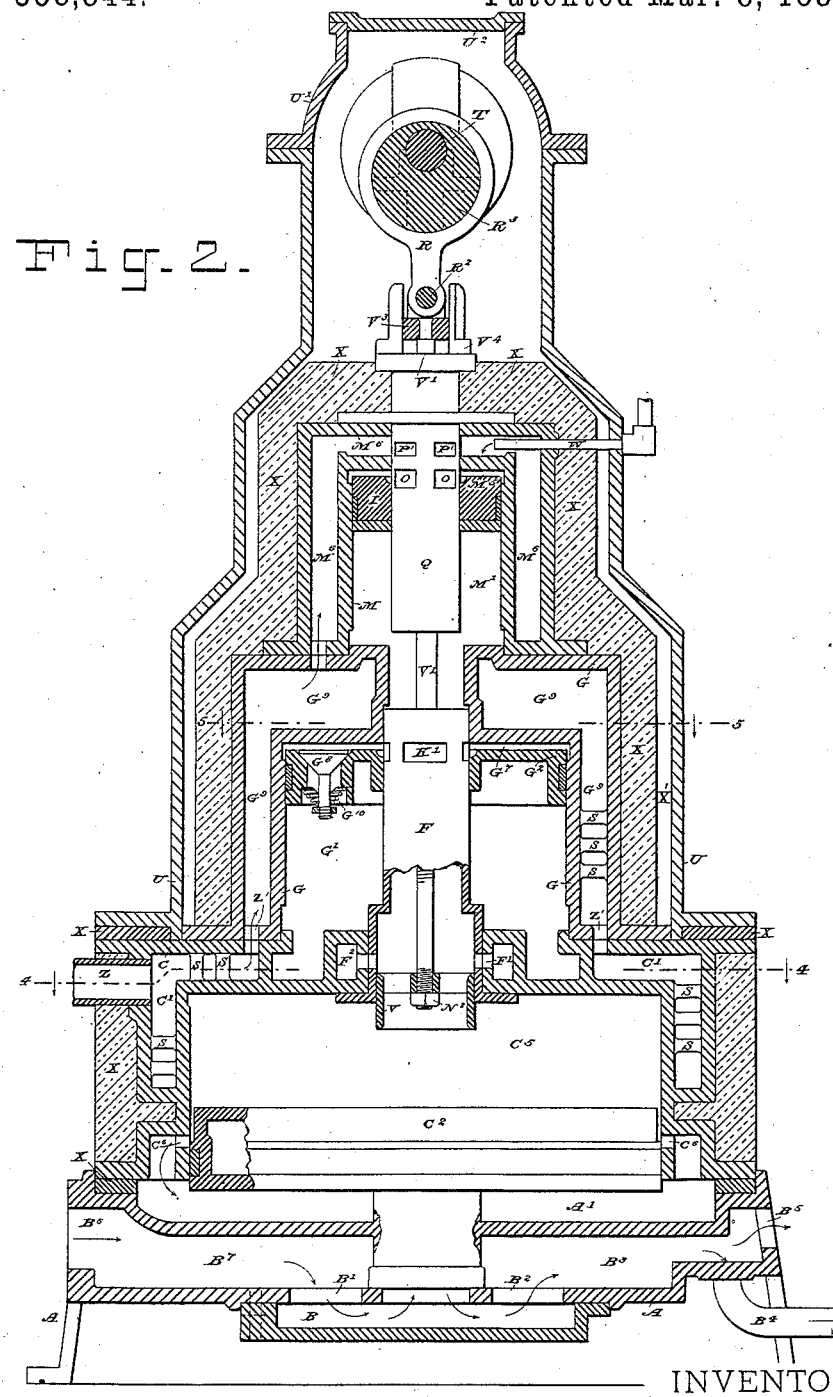

(No Model.) 6 Sheets—Sheet 3.
R. CREUZBAUR.
STEAM ENGINE.
No. 358,844. Patented Mar. 8, 1887.
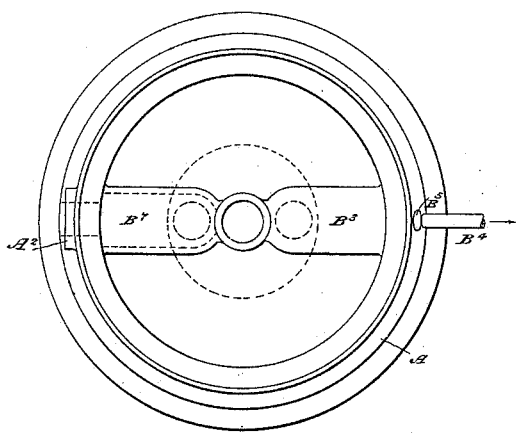
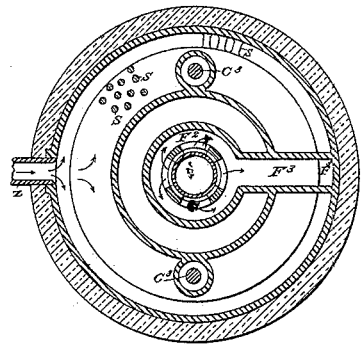
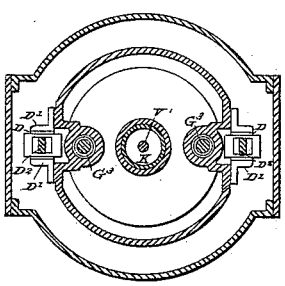
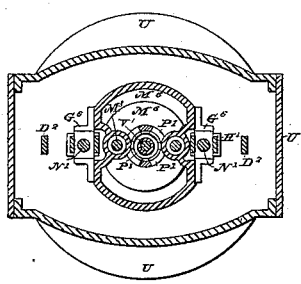
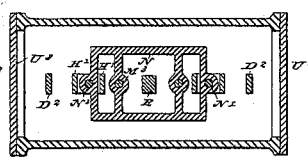
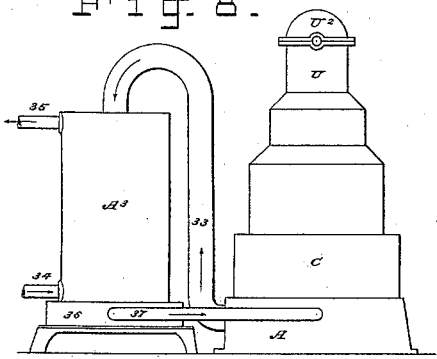
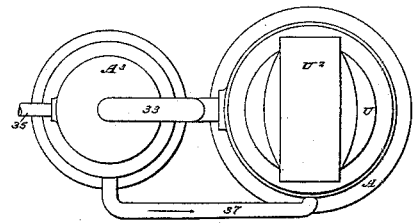
WITNESSES:
E. B. Bolton
Frank Moulin
INVENTOR:
Robert Creuzbaur
By his Attorney,
Henry Connett

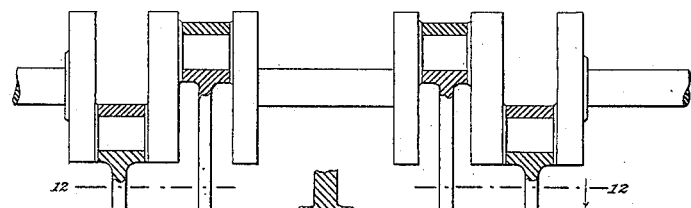

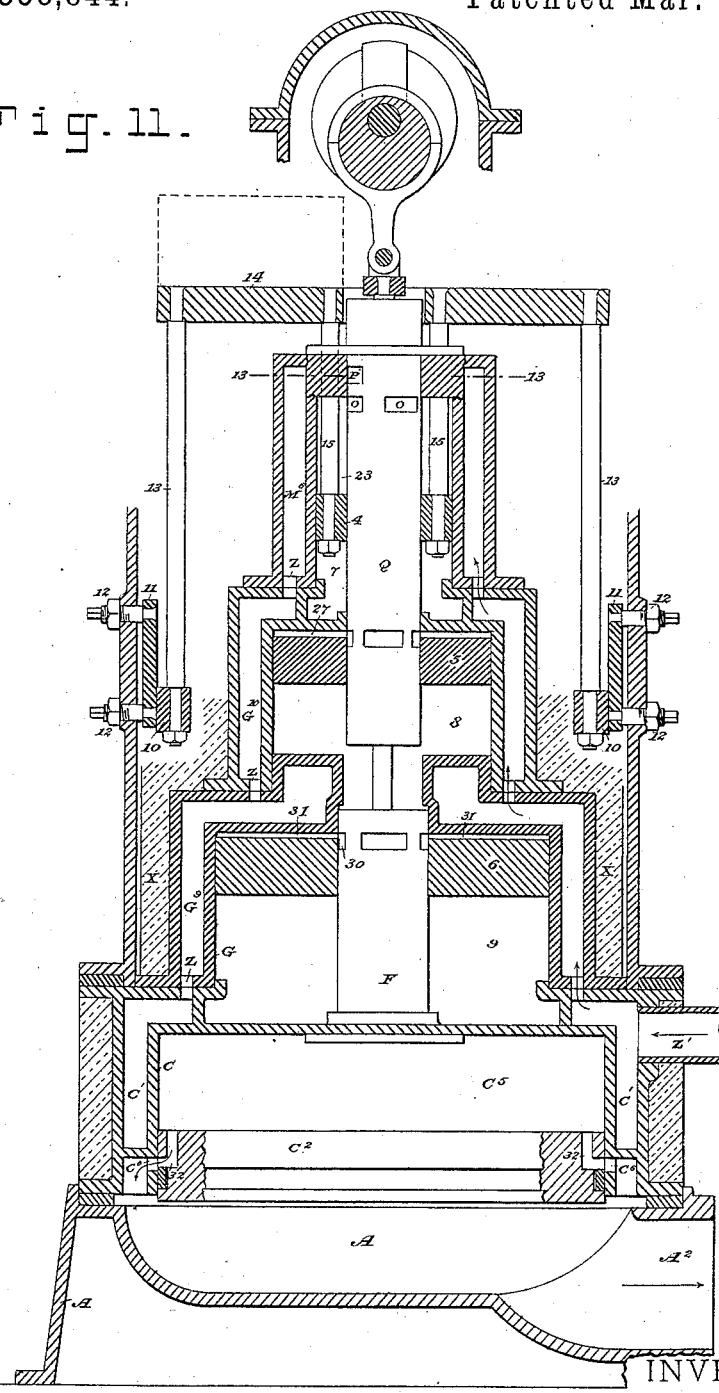

(No Model.) 6 Sheets—Sheet 6.
R. CREUZBAUR.
STEAM ENGINE.
No. 358,844. Patented Mar. 8, 1887.
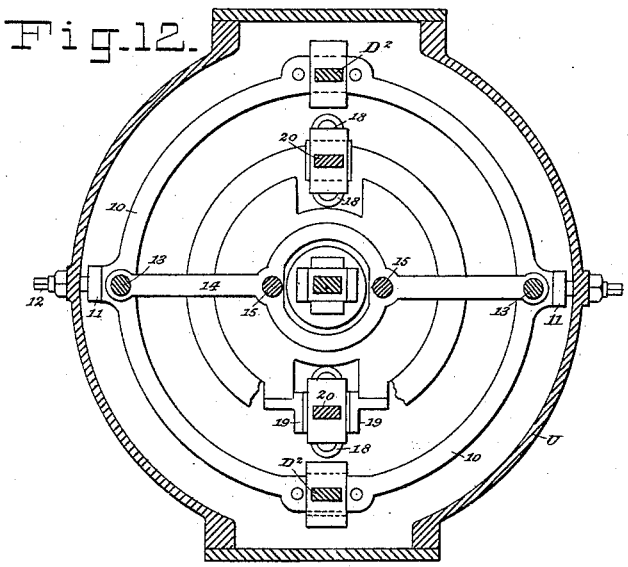
Fig. 12.
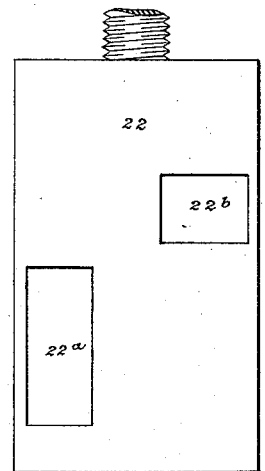
Fig. 15.
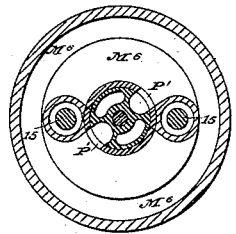
Fig. 13.
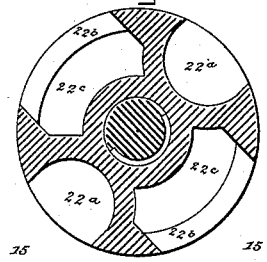
Fig. 14.
Fig. 16.
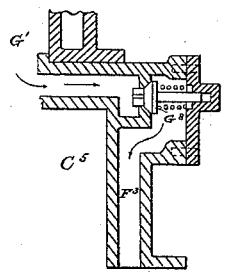
Fig. 17.
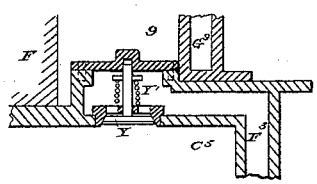
Fig. 18.
WITNESSES:
E. B. Bolton
Frank Moulin
INVENTOR:
Robert Creuzbaur
By his Attorney,
Henry Connett

UNITED STATES PATENT OFFICE.

ROBERT CREUZBAUR, OF BROOKLYN, NEW YORK.

STEAM-ENGINE.

SPECIFICATION forming part of Letters Patent No. 358,844, dated March 8, 1887.

Application filed July 7, 1886. Serial No. 207,309. (No model.)

*To all whom it may concern:*

Be it known that I, ROBERT CREUZBAUR, a citizen of the United States, and a resident of Brooklyn, Kings county, New York, have invented certain new and useful Improvements in Steam-Engines, of which the following is a specification.

My invention relates to improvements in single-acting compound engines arranged or placed "tandem"—that is to say, placed end to end—and acting conjointly upon a common crank-shaft, in general arrangement as illustrated in my several applications for Letters Patent of the United States filed on the dates and bearing the serial numbers following, namely: July 13, 1885, No. 171,412; July 13, 1885, No. 171,413; February 24, 1886, No. 193,001, and March 2, 1886, No. 193,721.

My improvements for which Letters Patent of the United States are hereby applied for are, first, a tandem compound engine comprising three or more single-acting steam-cylinders placed end to end, with their respective pistons coupled to a common crank-shaft, the predominant forces acting upon such shaft constantly and approximately in one direction; second, the construction of such an engine so that in the conjoint operation of its component parts the hottest steam will enter the high-pressure cylinder on one extremity of the conjoined cylinders, preferably on the top end, from whence, while acting successively upon all the several pistons, the steam will have a continued downward course, and will enter, step by step, into chambers of lower and lower temperature, thus preventing the extreme differences of temperature in adjacent chambers fatal to economical expansion; third, the construction of such an engine so that the pistons are cushioned at the ends of their respective working strokes upon increasing resisting pressure of dead or inclosed steam, whereby the crank-pins and shaft-bearings are relieved of the destructive strain and friction caused by their checking the momentum of the moving parts without the aid of such cushions; fourth, the steam-distribution in such a tandem compound engine with three or more cylinders by one eccentric acting by one stem upon the valves, with constant strain in one direction upon such eccentric; fifth, the coupling of two of the pistons so that the connecting-rods and crank-pins of one of the pistons, as well as the cushioning of one of the pistons, will serve as such for the other; sixth, in an engine having its crank-shaft and the exhaust-steam chamber arranged at opposite ends, as hereinafter described, the arrangement whereby the non-working side of the low-pressure piston is acted upon by the exhaust-steam in free communication with the condenser, whereby the pressure in the condenser and the resistance to the piston is varied in harmony with the requirements of the piston; seventh, the construction whereby the weights reciprocating in contrary directions in the line of the cylinder-axis are truly equal; eighth, the construction whereby the weights swinging in contrary directions transversely to the axes of the cylinders are approximately balanced; ninth, the construction whereby the non-working end of a cylinder is utilized as a receiver; tenth, the construction whereby the steam is delivered and discharged centrally upon and from the several cylinders; eleventh, the prevention of backlash in the low-pressure piston in contact with the exhaust-chamber by coupling such piston to another piston; twelfth, providing a relief-valve whereby the pressure in a cushion-chamber is controlled; thirteenth, providing a relief-valve in the low-pressure cylinder, whereby steam from the exhaust-chamber is admitted to prevent backlash. I attain these objects by the mechanism illustrated in the accompanying drawings, in which—

Figure 1 is a vertical section of a compound single-acting three-cylinder engine embodying my invention, the plane of the section being taken axially through the crank-shaft. Fig. 2 is a similar section taken at right angles to Fig. 1, and some of the minor parts shown in elevation. Fig. 3 is a plan of the base or bed plate of the engine as seen when the upper parts are removed. Fig. 4 is a horizontal section taken on line 4 4 in Fig. 2. Figs. 5, 6, and 7 are horizontal sections taken, respectively, on lines 5 5, 6 6, and 7 7 in Fig. 1. Figs. 3 to 7, inclusive, are drawn to a scale one-half that of Figs. 1 and 2. Fig. 8 is an elevation, and Fig. 9 a plan, showing the relative positions and connections of the engine and the condenser. These views are drawn to a scale one-fourth that of Figs. 1 and 2. Figs. 10 to 16, inclusive, illustrate an engine with four cylinders embodying my invention, in which the steam expands from the smallest cylinder successively into all the other cylinders. Fig. 10 is a section similar to Fig. 1, but with some portions of the exterior casing removed or broken away, and Fig. 11 is a section similar to Fig. 2. Fig. 12 is a horizontal section taken on line 12 12 in Fig. 10. Fig. 13 is a horizontal section taken on line 13 13 in Fig. 11. Figs. 14, 15, and 16 represent, respectively, in cross-section, elevation, and vertical section, on a large scale, the distributing-valve located, with its casing, in the axis of the high-pressure cylinder. Line 14 14 in Fig. 16 shows the plane of the section Fig. 14. Fig. 17 is a vertical section of part of the cylinder-space $C^5$ and cushion-chamber $G'$, with channel $F^3$, provided with a relief-valve to chamber $G'$. Fig. 18 is a vertical section of a part of chambers $C^5$ and 9, together with adjacent parts, and showing a relief-valve, Y, to chamber $C^5$.

Like letters and reference-numbers refer to like parts throughout the several figures.

A is the base of the engine embodying or containing the exhaust-chamber $A'$, which, through outlet $A^2$, Figs. 1 and 3, may empty into the atmosphere or into a condenser, $A^3$, Figs. 8 and 9. In the latter case, with the general arrangement as described in my said application No. 193,721, $A^4$ (best seen in Fig. 1) forms the air-pump barrel, which is fed from chamber B through the valve-opening $B'$, Fig. 2, and delivers through valve-opening $B^2$ into a channel, $B^3$, leading to the feed-pump through pipe $B^4$, and to the atmosphere through opening $B^5$. In base A, $B^6$ is the inlet for condense-water and gases coming from the condenser and passing through channel $B^7$ to valve-opening $B'$.

C is the low-pressure cylinder, open at the bottom and surrounded, as far as practicable, by boiler steam-jacket $C'$.

$C^2$ is the low-pressure piston, connected by two rods, $C^3 C^3$, which pass through corresponding stuffing-boxes $C^4$ to the respective cross-heads D, guided by brackets $D'$, Fig. 5, and coupled to the respective crank-pins E by connecting-rods $D^2$, in the usual way. The cylinder-space $C^5$ receives steam through a central sleeve, F, and exhausts through ports $C^6$, Figs. 2 and 11, opening into chamber $A'$. When the space $C^5$ exhausts into the atmosphere, additional exhaust-ports, $F'$, Figs. 2 and 4, are provided through sleeve F, enlarged for the purpose, as shown, into an annular space, $F^2$, and channel $F^3$, Figs. 4 and 17, which connects with chamber $A'$. The valve V, controlling ports $F'$, is operated in unison with the other valves, as will be hereinafter described.

In order to simplify the drawings, I have shown the engine in Fig. 1 as it will appear when valve V and ports $F'$ are not employed.

In my pending application, Serial No. 193,001, I show and claim a construction somewhat similar to that above described, and I do not herein claim the construction set forth and claimed in said application.

The intermediate cylinder, G, Figs. 1 and 2, is also open at the bottom, and is concentrically fitted upon cylinder C. The piston $G^2$ is in like manner connected by two rods, $G^3 G^3$, passing through stuffing-boxes $G^4$, to cross-heads $G^5$, guided by brackets $G^6$, Fig. 6, and coupled to their respective crank-pins H by connecting-rods $H'$, in the usual way.

The space $G'$ between piston $G^2$ and the top of cylinder C forms a cushion-chamber, which arrests the downward momentum of piston $G^2$ and of the high-pressure piston I, which move in unison, as set forth hereinafter.

The chamber $G'$ will gradually fill with steam leaking past the piston $G^2$ from the upper or working chamber, $G^7$. Steam condensed in chamber $G'$ is re-evaporated by the superheated steam in jackets $C'$ and $G^9$, the latter surrounding cylinder G as far as practicable; or such condense-water will be ejected through a relief-valve, hereinafter described.

The chamber $G^7$ receives steam and exhausts through ports $K'$, controlled by valve K. The top of cylinder C embraces part of cushion-chamber $G'$, the stuffing-boxes $C^4$, and the upper part of jacket $C'$. The top of cylinder G embraces the two stuffing-boxes $G^4$ and the upper part of steam-jacket $G^9$. The high-pressure cylinder M, which is also open at the bottom, is concentrically fitted upon the top of cylinder G. Its piston I is coupled by two rods, $M^3$, passing through stuffing-boxes $M^4$, to a yoke, N, Figs. 1 and 7, which is attached to extensions $N'$ of rods $G^3$, so that the two pistons $G^2$ and I move in unison. The working-chamber $M^5$ above piston I receives steam and exhausts through ports O, controlled by valve P, the exhaust-steam passing downward through sleeve or tube Q and around the lower end of the latter into receiver $M'$. Cylinder M is surrounded, as far as practicable, by live-steam jacket $M^6$, Fig. 2, which extends over the top of cylinder M, and thus surrounds the sleeve Q and valve P, which receives steam from the jacket $M^6$ through ports $P'$ and delivers it to chamber $M^5$, as aforesaid.

The two valves K and P, if a condensing-engine, or the three valves V, K, and P, if a non-condensing engine, are adjustably attached to a screw-threaded stem, $V'$, common to all, which passes through the screw-threaded valves, which are securely locked to the stem $V'$, each by a lock-nut, $N^2$. Stem $V'$ passes through a stuffing-box, $V^2$, to a cross-head, $V^3$, guided by brackets $V^4$. This cross-head is coupled to the eccentric strap and arm R by wrist-pin $R^2$.

Longitudinal grooves (not shown) cut along the central eye of the valve P serve to bal ance the pressure upon the two ends of valve P.

The respective end pressures upon the valve K are not balanced, there being no balancing-opening through the valve. As the pressure above this valve K is always greater than the pressure under it, the pull upon the eccentric $R^3$ will be constantly downward.

The crank-shaft T has its two end bearings in shell U, which is concentrically fitted upon the cylinder C.

T' are center bearings for shaft T, which may be omitted when more room is required for a governing cut-off eccentric and its attachments, the shaft in that case being thickened in its central portion between the two arms $T^2$.

U' is the cap of casing U, and $U^2$ a loose cover giving ready access for lubricating the shaft and its accessories, which is done in the usual way.

$U^3$ are caps covering hand-holes through which access is had to the stuffing-boxes and the moving parts.

X represents heat-intercepting material, and X' air-spaces intervening between X and shell U.

The inner and outer walls of the steam-jackets are connected homogeneously or integrally by pegs or bars S, which receive heat and carry the heat so received, together with the heat received by the outer wall, to the inner wall, thereby largely increasing the capacity of the latter to transmit heat to the active steam in the cylinders and passages, as described and claimed in my applications bearing the serial numbers 193,001 and 219,241.

In my pending application No. 209,205, I also show and claim connected steam-jackets on the cylinders forming a live-steam passage. I wish it understood that I do not herein claim what is shown and claimed in my said applications.

The low-pressure piston $C^2$, with its attachments, is made of equal weight with the pistons $G^2$ and I and their attachments, and the swinging ends of connecting-rods $D^2$ are made of such weight as will balance the transverse momentum of the swinging ends of the connecting-rods H'.

The operation of the engine is as follows: As an important condition for the perfect and economical working of the engine, the boiler-steam is superheated, as described in my application for Letters Patent last named, ere it enters through inlet Z' into the lowest jacket, C', and through channels Z to and through the other jackets, $G^9$ and $M^6$, to the uppermost part of jacket $M^6$, where the steam receives lubrication through pipe W, Fig. 2. For convenience of illustration, the valves P K V are represented in their lowest position. From the upper part of chamber $M^6$ the steam passes through ports P' into the annular space $P^2$ of valve P, from whence the steam passes through ports O into chamber $M^5$ and forces piston I downward. Near the end of the piston's stroke the lower end of valve P, which will then have made about three-eighths of its upstroke, will commence to open ports O to the exhaust-passage downward through tube Q, and around the lower end of tube Q into receiver M'. During this action, as regards piston I, the steam in receiver M', lodged there during the previous upstroke of piston I, passes through ports K' into chamber $G^7$ simultaneously with the passage of steam into chamber $M^5$, as named. The steam thus passed into chamber $G^7$ presses upon piston $G^2$, which moves in unison with piston I. During the exhaust of the steam from chamber $M^5$ into the receiver M' the steam in chamber $G^7$ exhausts through ports K', past the lower end of valve K, and down through sleeve F into chamber $C^5$, forcing down the piston $C^2$ during the upward stroke of pistons $G^2$ and I. When near the end of its stroke, the piston $C^2$ uncovers ports $C^6$, through which the steam exhausts into chamber A', and passes through outlet $A^2$ to the condenser or to the atmosphere. If to the latter, the compression of the steam remaining in chamber $C^5$ after the ports $C^6$ are closed would be too great if not prevented by the exhaust-ports $F^7$ in sleeve F, Fig. 2, which are uncovered by the upper edge of valve V and connect through channels $F^2$ $F^3$, Fig. 4, with exhaust-chamber A'. These ports $F^7$ are uncovered by valve V during the lower three-eighths stroke of the valves about simultaneously with the passage of the steam into chamber $M^5$. A valve, $G^8$, may be located in piston $G^2$, as shown in Fig. 2. In high-speed machines such valve $G^8$ may be located in the lower part of cushion-chamber G', as represented in Fig. 17, opening into exhaust-channel $F^3$ and chamber A'. As located in Fig. 2, the valve returns the surplus steam in G' to chamber $G^7$, where it is utilized, first in balancing the pressure in G', and then, during the upward stroke of piston $G^2$, in acting upon low-pressure piston $C^2$. When valve $G^8$ is placed to deliver into exhaust-chamber A', as shown in Fig. 17, the steam passing through it is lost; but, so located, the valve serves the better to drain the chamber of condense-water. The tension of spring $G^{10}$ must be so regulated that when running near the lowest normal speed the downward pressure upon the crank-pins is not suspended during any part of the revolution by the maximum pressure in chamber G'.

When an automatic cut-off is used with a wide range, or when steam below the normal pressure due to the degree of expansion of the engine is used, or when the condenser acts imperfectly, in all of which cases the pressure in chamber $C^5$ is liable to fall sufficiently lower than that in chamber A' to cause backlash of the piston $C^2$ and its connections, thus interrupting the important condition of constant strain downward upon the crank-pins, notwithstanding the weight and momentum of piston $C^2$ and its attachments, the valve Y, Fig. 1, comes into play. The spring Y', which resists the valve's opening, is adjusted so that before such backlash can take place the undue overpressure in chamber A' will find vent through valve Y, re-enforcing the pressure in chamber C⁵, thus not only preventing backlash, but also tending to greater economy. With a high-speed engine this valve Y may be located in the circumference or side wall of cylinder C above the working-surface of piston C², or in the top of the cylinder, as represented in Fig. 18, and properly connected with the exhaust-chamber A'. In a four-cylinder engine, as described hereinafter, wherein the low-pressure piston C² is coupled with the high-pressure piston, the down-pressure upon the latter overbalances, to a great extent, the abnormal pressure under the low-pressure piston, and renders such valve Y unnecessary in ordinary cases. Furthermore, the use of valve G³ may be avoided by providing such cushion-chamber G' with a hand-cock and proper connections, whereby overpressure, indicated by backlash or by a special pressure-gage fitted with a dash-pot in the usual way, is removed by opening such cock by hand, its exhaust delivering into chamber A', the cock being then kept just sufficiently open to prevent such accumulation of steam; and, instead of valve Y, a hand cock or valve, as described and claimed in my pending application, Serial No. 171,413, may be applied under some circumstances, whereby boiler-steam from the jacket is fed into the cylinder-space C⁵, such valve also serving to start the engine and to give it more power in emergencies. Ordinarily valve Y is preferred for checking such backlash.

There being two stuffing-boxes to each of the pistons, it is important that they be constructed so as to require no attention for a considerable length of time. Such endurance is attained by the construction shown in Fig. 1. The metal packing 2 consists of rings truly fitted to stem C³ and cut into three or more sections arranged to break joints lengthwise of the rod C³, 3 being elastic packing backing the sections 2, and keeping them in true and elastic contact with the rod. All wear of the packing 3 is thus prevented. Dust being excluded from the working parts by the casing U U', and the space inclosed thereby being moist, warm, and saturated with oily vapor, lubrication of the working parts is made easy and approximately constant. To insure this, a quantity of lubricating-fluid may be lodged on the top of cylinder C within the base of casing U.

The four-cylinder engine represented by Figs. 10 to 16, inclusive, is constructed and operated substantially as the three-cylinder engine described, with the following modifications:

The high-pressure-cylinder piston 4 is coupled to the low-pressure piston C². The two intermediate pistons, 5 and 6, are coupled together. Under piston 4 is a cushion-chamber, 7, which may be provided with a valve, G⁸, as shown in Fig. 2 or in Fig. 17, opening into receiver 8 under piston 5 instead of into chamber A'. The space 8 under piston 5 serves as receiver for the steam exhausting from chamber 27. The chamber 9 under piston 6 is a cushion-chamber, which may also be provided with a relief-valve, G⁸, as in Fig. 17.

The coupling of pistons 4 and C² may be attained in various ways. I prefer the following method: A ring, 10, Figs. 10, 11, and 12, is secured to the top of the cross-heads D, the latter being guided by means of ring 10, which at right angles to D D slides upon guides 11, made adjustable through screws and nuts 12, as shown in Figs. 11 and 12. Opposite these guides 11 the rods 13, detachably connected to ring 10, rise vertically and are attached to yoke 14, to which the two piston-rods 15 of piston 4 are also attached, as shown. The piston-rods 16 and 17 of pistons 5 and 6 are attached on their respective sides to a cross-head, 18, guided by slides 19, Fig. 12, and coupled by wrist-pin 21 to connecting-rods 20, as shown in Figs. 10 and 12. The valve 22 for the high-pressure piston 4 is constructed, as shown in Figs. 14, 15, and 16, on a larger scale. Its recesses 22ᵃ on opposite sides convey steam from jacket M⁶ to the high-pressure cylinder, and its two opposite ports 22ᵇ exhaust the steam from chamber 23 through valve-channels 22ᶜ, open at both ends, to balance the pressure upon the valve into the tube Q. The valves 24 and 25 are solid pistons. All the four cylinders are surrounded by superheated steam in jackets C', G⁹, G¹⁰, and M⁶, connected by passages Z, as in the three-cylinder engine illustrated in Figs. 1 and 2.

The operation of the engine is as follows: The steam in the upper part of jacket M⁶ passes through opposite ports P' in sleeve Q into recesses 22ᵃ, the valve being then near its upper position, and from there through opposite ports O into the chamber 23 above piston 4, forcing the latter down into the position shown in Figs. 10 and 11. Then, while ports 22ᵇ in valve 22 coincide more or less with ports O, the steam exhausts from chamber 23 through ports O 22ᵇ, valve-channels 22ᶜ, and through ports 26 into space 27 above piston 5. That piston, in conjunction with piston 6, having then made its working stroke downward, the valves in the meantime moving upward, the lower edge of valve 24 will have uncovered ports 26, allowing the steam from chamber 27 to exhaust through and around the lower edge of tube Q into receiver 8, from where, during the next downstroke of pistons 5 and 6, the steam passes through ports 30 into chamber 31 above piston 6. The piston 6 having thus been forced down into its lowest position, the valve 25 rising meantime and uncovering with its lower edge the ports 30, the steam exhausts from chamber 31 through sleeve F into chamber C⁵ above the low-pressure piston C². The piston C² thus forced downward near the end of its stroke uncovers exhaust-ports C⁶, bringing the same to coincide with exhaust-ports 32 in the piston. These ports 32 are cut through the piston, so as to give larger coinciding working-surfaces between cylinder C and piston C² than when constructed as shown in Figs. 1 and 2.

When no condenser is used, a supplemental valve, V, and exhaust-channels will have to be applied, as above described with reference to the three-cylinder engine, unless a very large clearance-space is provided above piston C².

When a condenser is used, it is in a general way attached as shown in Figs. 8 and 9, wherein A³ is the condenser. The exhaust-steam emerges from the base A of the engine and passes through pipe 33 into the top of this surface-condenser, passing downward and being condensed in a number of tubes, in the usual way, surrounded by water entering at 34 and discharging at 35. From the bottom chamber, 36, of the condenser, into which the condensing-tubes discharge, the resulting water and gases pass through tube 37 to the air-pump, which may be in the base of the engine, as in Fig. 1, or elsewhere. If the air-pump is in the base of the engine, the condenser is placed high enough to give a free flow of the water by gravity into and through channel B⁷ in base A. Chamber A' being thus in free communication with the condenser, the downward stroke of piston C² when the engine is operating normally causes an increase of pressure in the condenser, which serves the better to cushion piston C² and its attachments, and causes an increased activity of condensation, whereby the pressure in the condenser when the piston commences its next downstroke is brought below its normal degree, with a corresponding increase of economy.

It is evident that more than four cylinders, with a corresponding number of steam-distributing valves, may be thus combined by the means above described. The pistons not coupled together may have different respective strokes, as illustrated in the four-cylinder engine, in which the two coupled intermediate pistons have three-fourths the stroke of the other pistons. However, an equal stroke of all the pistons is requisite to attain a perfect balance of the moving parts under varying speeds. In such a four-cylinder engine the fall of temperature of the steam between its entrance into the high-pressure cylinder and into the condenser takes place successively in six compartments, making the difference in two adjoining compartments correspondingly small, and the effect of such difference is totally neutralized by the accession of heat from the superheated steam in the jackets provided with heat-pegs, as named.

The expansion of the steam into the central exhaust-tubes and all other dead spaces and clearances causes no loss of heat, as no work is done thereby.

By enlarging the space above the valve of the high-pressure cylinder and omitting the openings in the upper end of the valve, thereby making the space above it a cushion-chamber, the mean downward pressure upon the eccentric will be reduced to that due to the difference of area between this valve and the lower larger valve.

I am aware that it is not new in a compound engine having two working-pistons to connect these pistons rigidly together, and that it is not new in such an engine to arrange the crank-shaft and the exhaust-steam chamber both at one end or below the engine, the steam-distribution mechanism and piston-rod passing through the said exhaust-steam chamber. In engines of this class the exhaust-steam chamber opens directly to the condenser, and an auxiliary cushioning-piston not acted on by the steam is employed. Such engines also have the steam-distribution valves mounted on one stem arranged in the axis of the engine-cylinders. These features I do not claim. In my engine the main crank-shaft and the valve-operating eccentric are arranged at one end of the engine and the exhaust-steam chamber at the other end. Consequently no part of the steam-distribution mechanism is in said exhaust-steam chamber. In my engine, also, one of the working-pistons moves independently of the others, as I have described, and I employ no auxiliary cushioning-piston, this being effected by a working-piston. The valves in my engine play also in a fixed ported tubular casing.

What I claim as my invention, and desire to secure by Letters Patent, is—

1. A tandem compound steam-engine embodying three or more single-acting cylinders, with their respective pistons coupled to a common crank-shaft.

2. A tandem compound steam-engine embodying three or more single-acting cylinders, with their respective pistons coupled to a common crank-shaft located on one end of all the cylinders, the active stroke of all the pistons being in the same direction, substantially as and for the purpose named.

3. A tandem compound steam-engine embodying three or more single-acting cylinders, with their respective pistons coupled to a common crank-shaft, with one eccentric and one valve-stem, whereby the steam-distribution for all the cylinders is accomplished.

4. A tandem compound steam-engine embodying three or more single-acting cylinders, with their respective pistons coupled to a common crank-shaft, with steam-distributing valves arranged to produce a predominant pressure constantly in one direction upon their driving mechanism, substantially as set forth.

5. A tandem compound steam-engine embodying three or more single-acting cylinders, with their respective pistons coupled to a common crank-shaft, with steam-distributing valves operating centrally in the axis of the cylinders and delivering the steam centrally upon the several pistons, substantially as set forth.

6. A tandem compound steam-engine embodying three or more single-acting cylinders, with their respective pistons coupled to a common crank-shaft, with the steam-distribution in one general direction, the steam entering successively in its constant course from one end of the engine to the other chambers of decreasing temperatures, substantially as set forth.

7. A tandem compound steam-engine embodying three or more single-acting cylinders, with their respective pistons coupled to a common crank-shaft, with the weights moving simultaneously toward and from the crank-shaft, balanced by equal weights moving simultaneously in the contrary direction, the mean centers of the weights moving in the common axis of all the cylinders.

8. A tandem compound steam-engine embodying three or more single-acting cylinders, with their respective pistons coupled to a common crank-shaft, with the weights moving simultaneously transversely to the crank-shaft in the same direction, approximately balanced by weights simultaneously moving in the contrary direction, with their mean centers traversing the axis of the cylinders.

9. A tandem compound engine embodying three or more single-acting cylinders, with their respective pistons coupled to a common crank-shaft, with the momenta of the pistons on their outward stroke cushioned with an increasing resistance produced in the inclosed non-working end of one of the respective cylinders, substantially as set forth.

10. A tandem compound condensing steam-engine having the exhaust-steam chamber of the low-pressure cylinder arranged to adjoin the non-working side of the low-pressure piston and open to the condenser, and having its main crank-shaft and valve-operating mechanism arranged at one end of the engine and the said exhaust-steam chamber at the opposite end of the engine, whereby the necessity of placing any portion of the steam-distribution mechanism in said exhaust-steam chamber is avoided, as set forth.

11. A tandem compound steam-engine embodying three or more single-acting cylinders, with their respective pistons coupled to a common crank-shaft, wherein the non-working end of a cylinder forms a receiver for the steam exhausted from the opposite end of such cylinder.

12. A tandem compound steam-engine embodying three or more single-acting cylinders, with their respective pistons coupled to a common crank-shaft, with the cylinders arranged along their common axis adjoining each other in the order of their increasing diameters, the smallest being nearest to the crank-shaft, as set forth.

13. A tandem compound steam-engine embodying three or more single-acting cylinders, with a cushion-chamber, $G'$, a working-chamber, $G^7$, a piston, $G^2$, and a relief-valve, $G^8$, operating conjointly as and for the purpose set forth.

14. A tandem compound steam-engine embodying three or more single-acting cylinders, with a working-chamber, $C^5$, an exhaust-chamber, $A'$, a piston, $C^2$, and a valve, Y, operating conjointly as and for the purpose named.

15. A tandem compound steam-engine embodying three or more single-acting cylinders, with two of the pistons coupled, whereby the wrist-pins, crank-pins, and connecting-rods of one of the pistons serve as such for the other piston so coupled, substantially as described.

16. A tandem compound steam-engine embodying three or more single-acting cylinders and their pistons, wherein the high and low pressure pistons are connected rigidly together to prevent backlash, and wherein one of the pistons is not connected with the said high and low pressure pistons and moves independently thereof.

17. A tandem compound steam-engine embodying three or more single-acting cylinders and their pistons, wherein the close cushion-chamber immediately under one of the working-pistons is made to serve as such for another piston by rigidly connecting said pistons, and wherein the other pistons move independently from said connected pistons, but are coupled to the same crank-shaft, whereby they balance the momenta.

18. The combination of the three or more engine-cylinders arranged tandem, their pistons, the crank-shaft to which said pistons are coupled in common, the single valve-operating eccentric, the single valve-stem, the distribution-valves for all the cylinders mounted on said stem, and the fixed ported tubular casings in which said valves play.

19. The combination of the low-pressure cylinder C, provided with exhaust-ports $C^6$, adapted to be uncovered by the piston, and with exhaust-ports $F'$, controlled by a valve, the piston $C^2$, the valve V, and the mechanism for operating said valve, as set forth.

20. In a compound engine, the combination of the cylinders G and M, their respective pistons $G^2$ and I, connected together and coupled to crank-pins on a common crank-shaft, the said crank-shaft, and a close chamber, $G'$, below the piston $G^2$ to form a cushion-chamber for both of the connected pistons, as set forth.

21. In a multiple-cylinder compound engine, the intermediate cylinder, G, provided with a close cushion-chamber, $G'$, below its piston, and its piston $G^2$, provided with a relief-valve, $G^8$, substantially as and for the purposes set forth.

22. The low-pressure cylinder of a compound engine open to the exhaust-chamber at its non-working end, and the piston of said cylinder provided with a relief-valve opening into the cylinder on the working side of the piston, as set forth.

23. A tandem compound engine having three or more cylinders and said cylinders having connected steam-jackets, with an inlet for the boiler-steam in the jacket of the low-pressure cylinder and an outlet for the steam from the jacket of the high-pressure cylinder to said cylinder, whereby the said jackets form a connected steam-conduit through which the steam flows in a direction opposite to its course through said cylinders.

In witness whereof I have hereunto signed my name in the presence of two subscribing witnesses.

ROBERT CREUZBAUR.

Witnesses:
    FRANK MOULIN,
    HENRY CONNETT.